UNITED STATES PATENT OFFICE.

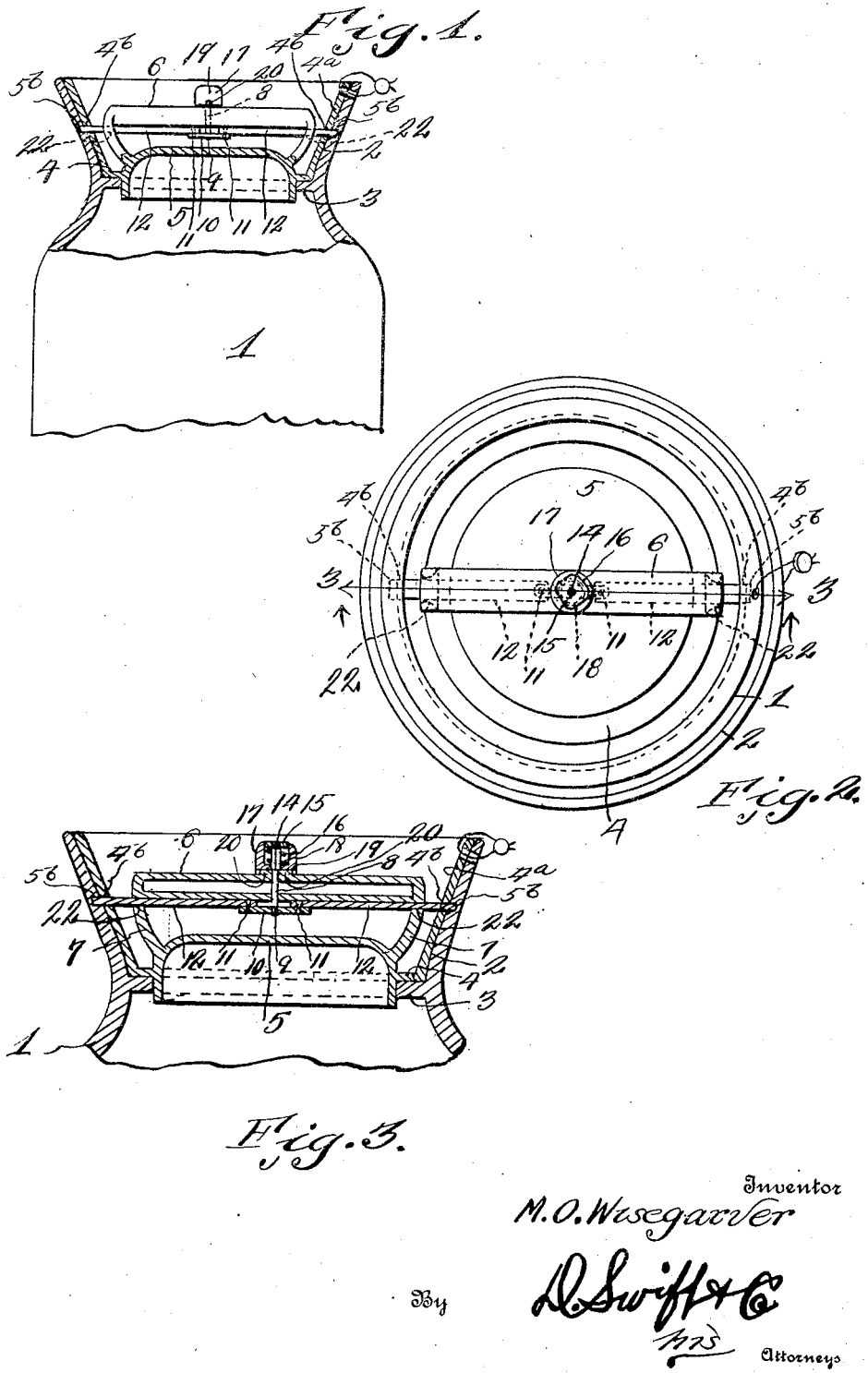

MARION OBIDAH WISEGARVER, OF UMBARGER, TEXAS.

MILK-CAN COVER.

1,340,097.        Specification of Letters Patent.        Patented May 11, 1920.

Application filed July 25, 1919. Serial No. 313,373.

*To all whom it may concern:*

Be it known that I, MARION OBIDAH WISEGARVER, a citizen of the United States, residing at Umbarger, in the county of Randall, State of Texas, have invented a new and useful Milk-Can Cover; and I do hereby declare the following to be a full, clear, and exact description of the invention, such as will enable others skilled in the art to which it appertains to make and use the same.

The invention relates to cover for metallic shipping and storing vessels and has for its object to provide a milk can of the type that is commonly used for shipping milk, with a cover locking means whereby the milk will be prevented from spilling from the can when the can is being handled in shipment, or to prevent the coming off of the cover if the can should be turned over during handling.

A further object is to provide a can cover with locking means carried by the handle thereof, said cover locking means comprising horizontally movable slide bars adapted to engage apertures in the flange of the cover and can mouth and means whereby said slidable bars may be moved into and out of engagement with the can mouth.

With the above and other objects in view the invention resides in the combination and arrangement of parts as hereinafter set forth, shown in the drawings described and claimed, it being understood that changes in the precise embodiment of the invention may be made within the scope of what is claimed without departing from the spirit of the invention.

In the drawings:—

Figure 1 is a sectional view through the mouth end of a milk can and its cover.

Fig. 2 is a top plan view of the milk can and cover.

Fig. 3 is a sectional view through the mouth of the can and the cover taken on line 3—3 of Fig. 2;

Referring to the drawings, the numeral 1 designates a conventional form of milk can of the type that is commonly used for shipping milk, however, it is to be understood that the device may be applied to various forms of milk cans now in use. In the mouth 2 of the can is an annular flange 3 adapted to receive the flange 4 of the can cover 5 when the cover is placed in the mouth of the can, said cover also being provided with a flange $4^a$ fitting the wall of the mouth of the can. The cover 5 is provided with a handle 6, said handle being connected to the cover 5 by means of the arms 7, which may be made integral with the cover and handle. Rotatably mounted in bearings of the handle 6 is a vertical shaft 8, the lower end of this shaft is secured as at 9 to a link 10, said link being adapted to move with the shaft 8. The ends of the link 10 are pivotally secured as at 11 to slidable bars 12, the outer ends of which are adapted to engage apertures $4^b$ in the flange $4^a$ and apertures $5^b$ in the can mouth, when it is desired to lock the cover 5 therein. Securely riveted to the upper end of the shaft 8 as at 14 is a rectangular plate 15, the plate 15 being disposed in a rectangular aperture 16 of a knob 17, there being a coiled spring 18 in the aperture 16 which bears against the plate 15 and the lower end of the aperture 16. Notches 19 are provided on the lower surface of the knob 17 and are adapted to receive the lugs 20 on the handle 6, thereby locking the shaft 8 against rotation.

When it is desired to unlock the cover so that the same may be removed from the can, the operator grasps the knob 17 and pulls upwardly thereon, this action compresses the spring 18 and allows the notches 19 to come out of engagement with the lugs 20 on the handle, then the knob 17 is turned in either direction, which turning action will move the link 10 in a horizontal plane thereby pulling the ends of the slidable bolts 12 out of engagement with apertures $4^b$ and $5^b$, said bolts 12 being guided in their outward and inward movement and by the apertures 22 in the handle arms 7.

The invention having been set forth what is claimed as new and useful is:—

A cover lock for metallic shipping and storing cans comprising a rotatable vertical shaft mounted in the handle of the cover, slidable bolts slidable in bearings of the handle and having their inner ends connected to the ends of a link secured to the lower end of the rotatable vertical shaft, the upper end of said vertical shaft having secured thereto a rectangular plate, said rectangular plate being disposed in an aperture of an operating knob, a coiled spring surrounding the shaft and having its upper end engaging the rectangular plate and its lower end engaging the bottom of the aperture and notches carried by the lower surface of the knob and adapted to receive lugs on the handle of the cover whereby the slidable bars may be locked in engagement with the mouth of the can or locked out of engagement with the same.

In testimony whereof I have signed my name to this specification in the presence of a subscribing witness.

MARION OBIDAH WISEGARVER.

Witness:
O. HENDRIX.